US009674131B1

(12) United States Patent
Chalamalasetti et al.

(10) Patent No.: US 9,674,131 B1
(45) Date of Patent: Jun. 6, 2017

(54) MESSAGE DELIVERY SYSTEM

(71) Applicant: International Business Machines Corporation, Armonk, NY (US)

(72) Inventors: Ram Subba Rao Chalamalasetti, Bangalore (IN); Venkata Kiran Kumar Darbha, Hyderabad (IN); Sudhanshu Pant, Uttarakhand (IN); Belavadi N. Ramesh, Bangalore (IN); Amar A. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/959,288

(22) Filed: Dec. 4, 2015

(51) Int. Cl.
*G06F 17/30* (2006.01)
*H04L 12/58* (2006.01)

(52) U.S. Cl.
CPC .......... *H04L 51/22* (2013.01); *G06F 17/3053* (2013.01); *G06F 17/30327* (2013.01); *G06F 17/30598* (2013.01); *H04L 51/26* (2013.01)

(58) Field of Classification Search
CPC .......... G06F 17/3089; G06F 17/30598; G06F 17/30699; G06F 17/30707; G06F 17/30867; G06F 17/30327; G06F 17/3053; H04L 51/22; H04L 51/26
See application file for complete search history.

(56) References Cited

U.S. PATENT DOCUMENTS 8,019,816 B2 * 9/2011 Dorai ................. H04L 12/5855
  709/204
8,458,192 B1 * 6/2013 Procopio ........... G06F 17/30702
  707/748
8,458,193 B1 * 6/2013 Procopio ........... G06F 17/30616
  707/749
8,605,642 B2   12/2013 Larsson et al.
9,087,020 B1 * 7/2015 Amacker .............. G06F 15/167
(Continued)

FOREIGN PATENT DOCUMENTS

DE    102011103631 A1    12/2012

OTHER PUBLICATIONS

IBM, "Publish/subscribe message properties," http://www-01.ibm.com/support/knowledgecenter/SSFKSJ_7.0.1/com.ibm.mq.amqnar.doc/ps22880_.htm, printed on Nov. 30, 2015, pp. 1-3.

(Continued)

*Primary Examiner* — Shiow-Jy Fan
(74) *Attorney, Agent, or Firm* — Erik K. Johnson

(57) ABSTRACT

An embodiment of the invention may include a method, computer program product and computer system for disseminating messages to a user. The embodiment may receive a plurality of messages. The embodiment may classify the plurality of messages based on metadata contained in each message, wherein the metadata corresponds to one or more topics. The embodiment may place one or more messages from the plurality of messages in a queue associated with a user. The embodiment may receive a request for a message from the user, wherein the request details a first preferred topic. The embodiment may determine a message in the user queue that corresponds to the first preferred topic. The embodiment may send the user the message from the plurality of messages corresponding to the first preferred topic.

14 Claims, 5 Drawing Sheets

(56) References Cited

U.S. PATENT DOCUMENTS

| | | | |
|---|---|---|---|
| 2003/0120785 A1* | 6/2003 | Young | H04L 29/06 709/228 |
| 2003/0135556 A1* | 7/2003 | Holdsworth | H04L 29/06 709/206 |
| 2005/0273499 A1* | 12/2005 | Goodman | G06Q 10/107 709/206 |
| 2006/0155581 A1* | 7/2006 | Eisenberger | G06F 17/3089 705/3 |
| 2008/0215695 A1 | 9/2008 | Duigenan et al. | |
| 2009/0125489 A1* | 5/2009 | Barker | G06F 9/542 |
| 2010/0077174 A1* | 3/2010 | Ma | G06F 9/5011 711/171 |
| 2011/0258268 A1* | 10/2011 | Banks | G06Q 10/06 709/206 |
| 2011/0289163 A1* | 11/2011 | Edwards | G06F 9/542 709/206 |
| 2012/0215872 A1* | 8/2012 | Beardsmore | H04L 51/14 709/207 |
| 2015/0039705 A1* | 2/2015 | Kursun | H04L 51/26 709/206 |
| 2015/0120854 A1 | 4/2015 | Bhat et al. | |
| 2015/0149569 A1 | 5/2015 | Feltham et al. | |

OTHER PUBLICATIONS

IBM, "Enabling content-based filtering with publish/subscribe," http://www-01.ibm.com/support/knowledgecenter/SSKM8N_8.0.0/com.ibm.etools.mft.doc/bq13460_.htm?lang=en, printed on Nov. 30, 2015, pp. 1-4.

\* cited by examiner

MESSAGE DELIVERY SYSTEM

BACKGROUND

The present invention relates to a message delivery system, and more particularly to a system that receives, organizes and delivers messages based on a subscriber's preferences.

BRIEF SUMMARY

An embodiment of the invention may include a method, computer program product and computer system for disseminating messages to a user. The embodiment may receive a plurality of messages. The embodiment may classify the plurality of messages based on metadata contained in each message, wherein the metadata corresponds to one or more topics. The embodiment may place one or more messages from the plurality of messages in a queue associated with a user. The embodiment may receive a request for a message from the user, wherein the request details a first preferred topic. The embodiment may determine a message in the user queue that corresponds to the first preferred topic. The embodiment may send the user the message from the plurality of messages corresponding to the first preferred topic.

BRIEF DESCRIPTION OF THE SEVERAL DRAWINGS

DETAILED DESCRIPTION

Embodiments of the present invention will now be described in detail with reference to the accompanying Figures.

Figure 1:
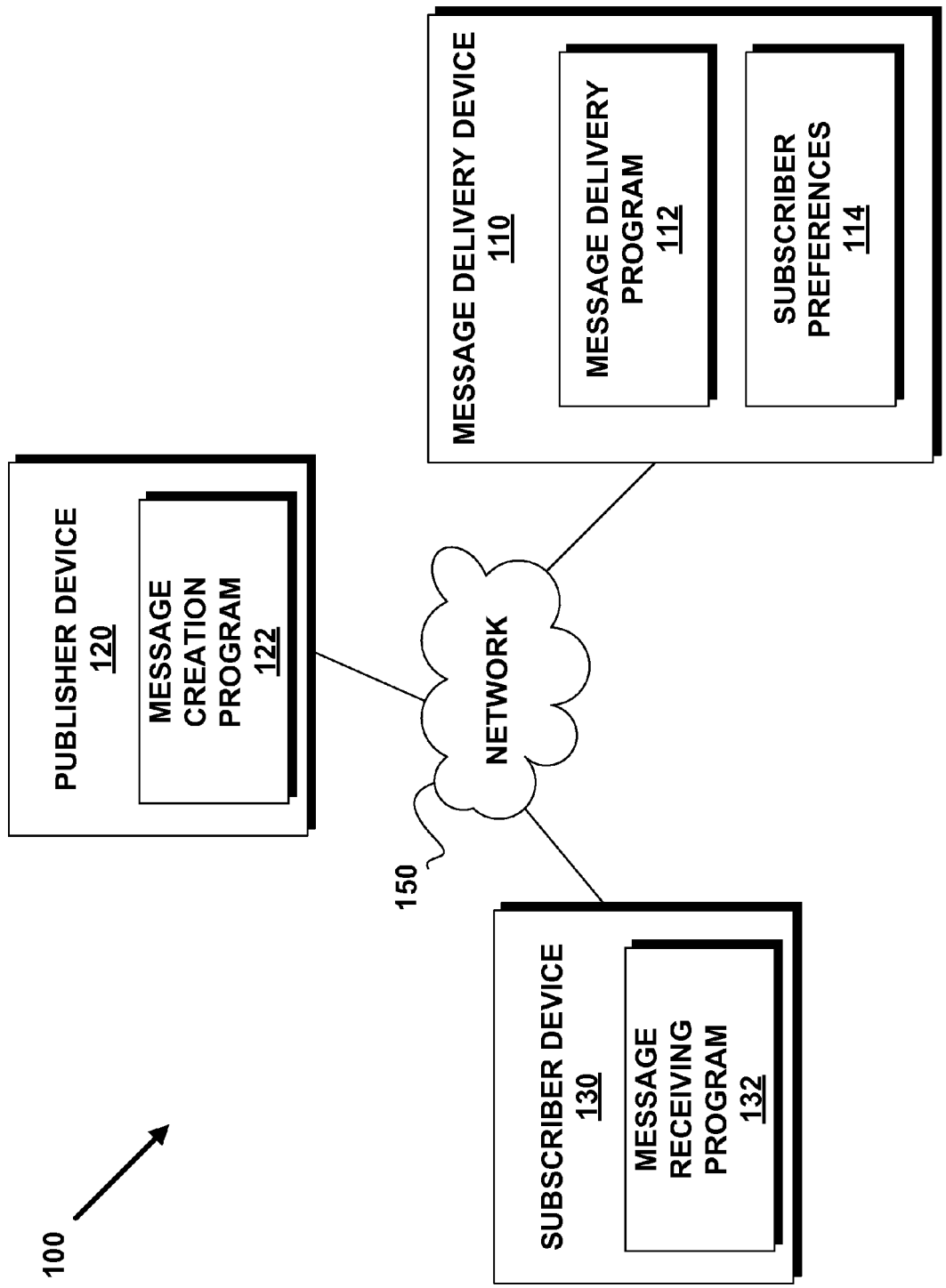
FIG. 1 illustrates a message delivery system, in accordance with an embodiment of the invention.

FIG. 1 illustrates message delivery system 100, in accordance with an embodiment of the invention. In an example embodiment, message delivery system 100 includes a message delivery device 110, a publisher device 120, and a subscriber device 130 interconnected via a network 150. While FIG. 1 illustrates 3 discrete devices in message delivery system 100, other arrangements may be contemplated.

Network 150 may include, for example, wired, wireless or fiber optic connections. In other embodiments, network 150 may be implemented as an intranet, a local area network (LAN), or a wide area network (WAN). In general, network 150 can be any combination of connections and protocols that will support communications between the message delivery device 110, the publisher device 120, and the subscriber device 130. In the example embodiment, network 150 is the Internet, representing a worldwide collection of networks and gateways to support communications between devices connected to the Internet.

Publisher device 120 includes message creation program 122. In the example embodiment, publisher device 120 is a desktop computer, a notebook or a laptop computer; however, in other embodiments, publisher device 120 may be a smart phone, a tablet computer, a handheld device, a thin client, or any other electronic device or computing system capable of receiving and sending data to and from message delivery device 110 via network 150. Publisher device 120 is described in more detail with reference to FIG. 3.

Message creation program 122 represents a client-side application located on publisher device 120 that interfaces with a publisher to create content, and transmits the content to the message delivery device 110. In an exemplary embodiment, the message creation program 122 may create content that may include text, audio, video, combinations thereof, and other relevant content for publishing. In an example embodiment, the message creation program 122 may be, for example, an e-mail client, or a smartphone app. In various embodiments of the invention the user created content, generated by message creation program 122, may additionally include metadata about the message such as, for example, time, date, sender/creator, and content of the message.

Subscriber device 130 includes a message receiving program 132. Subscriber device 130 may be a desktop computer, a notebook or a laptop computer, a smart phone, a cell phone, a tablet computer, a handheld device, or any other electronic device or computing system capable of securely sending and receiving to and from message delivery device 110 via network 150, and communicating that information with the specific user. Subscriber device 130 is described in more detail with reference to FIG. 3.

Message receiving program 132 represents a client-side application, located on subscriber device 130 that receives content from a message delivery device 110, and displays created content to a user. In an example embodiment, the Message receiving program 132 displays the content created by the message creation program 122, and communicates properties about the display of those messages to the message delivery device 110. Message receiving program 132 may communicate additional information to the message delivery device 110 relating to the content contained on subscriber device 130, such as the types of content and how much content is located on subscriber device 130.

Message delivery device 110 includes a message delivery program 112 and subscriber preferences 114. Message delivery device 110 may be a desktop computer, a notebook, a laptop computer, a tablet computer, a handheld device, a smart-phone, a thin client, or any other electronic device or computing system capable of receiving and sending data to and from other computing devices such as subscriber device 130 and publisher device 120 via network 150. Message delivery device 110 is described in more detail with reference to FIG. 3.

Subscriber preferences 114 contains information that details preferred settings for the user of the subscriber device 130 pertaining to delivery options of the message delivery program 112. The subscriber preferences 114 may be preferred topics, or rules for determining what content is preferred, as described in more detail below. Further, subscriber preferences 114 may contain upper limits on how much content, or how much of a certain type of content, subscriber device 130 would contain at any time. While depicted as being located on message delivery device 110, in another embodiment subscriber preferences 114 may be located on subscriber device 130.

Message delivery program 112 receives and classifies content created on publisher device 120, and distributes the information to subscriber device 130 based on subscriber preferences 114. Message delivery program 112 is described in more detail below, with reference to FIGS. 2a and 2b.

Figure 2A:
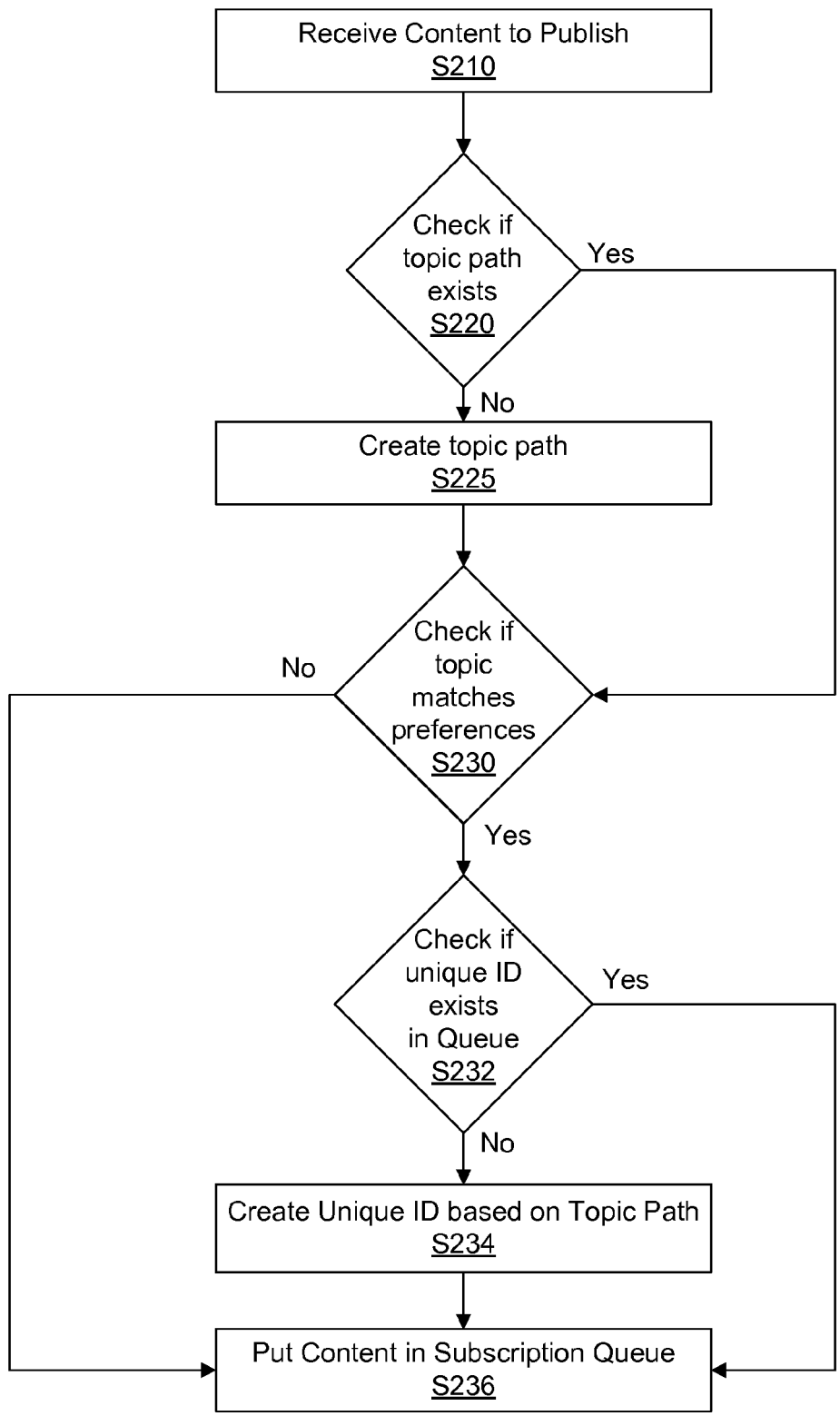
FIG. 2a is a flowchart illustrating the operations of the message delivery program of FIG. 1 in receiving content to be published, in accordance with an embodiment of the invention.
Figure 2B:
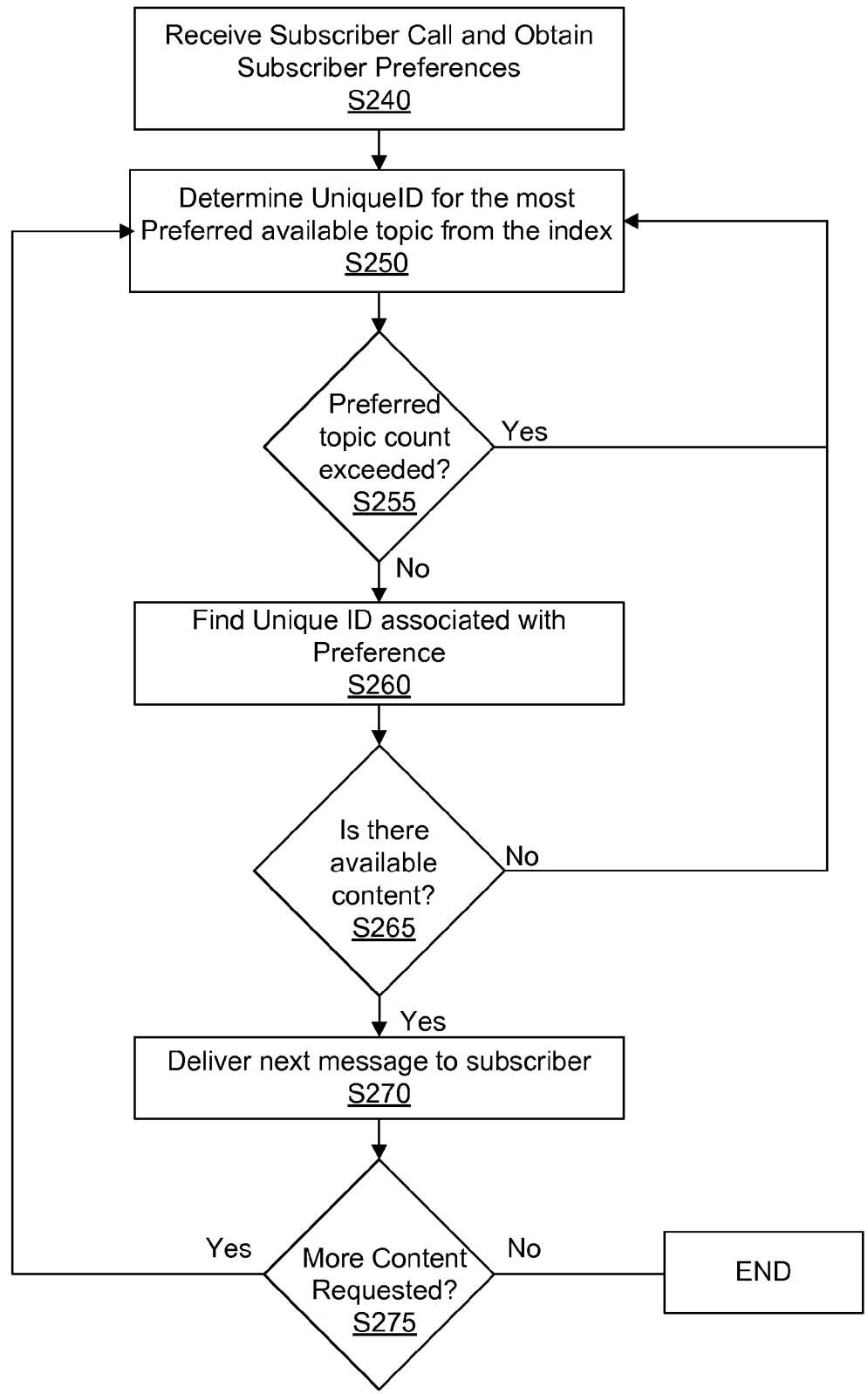
FIG. 2b is a flowchart illustrating the operations of the message delivery program of FIG. 1 after receiving a call from a subscriber for additional content, in accordance with an embodiment of the invention.

FIGS. 2a and 2b are flow charts illustrating the message delivery program 112. FIG. 2a illustrates the method for receiving, and classifying, content from a publisher device 120. FIG. 2b illustrates the method for distributing content to a subscriber, based on the subscriber's preferences.

Referring to step S210, message delivery program 112 receives content to publish from publisher device 120. The content received may be any type of content, such as video, audio, text, pictures, etc. The content may contain metadata describing aspects of the content, such as author of the content, subject of the content, geographic location of the subject, specific people that are subjects of the content, etc.

Figure 4:
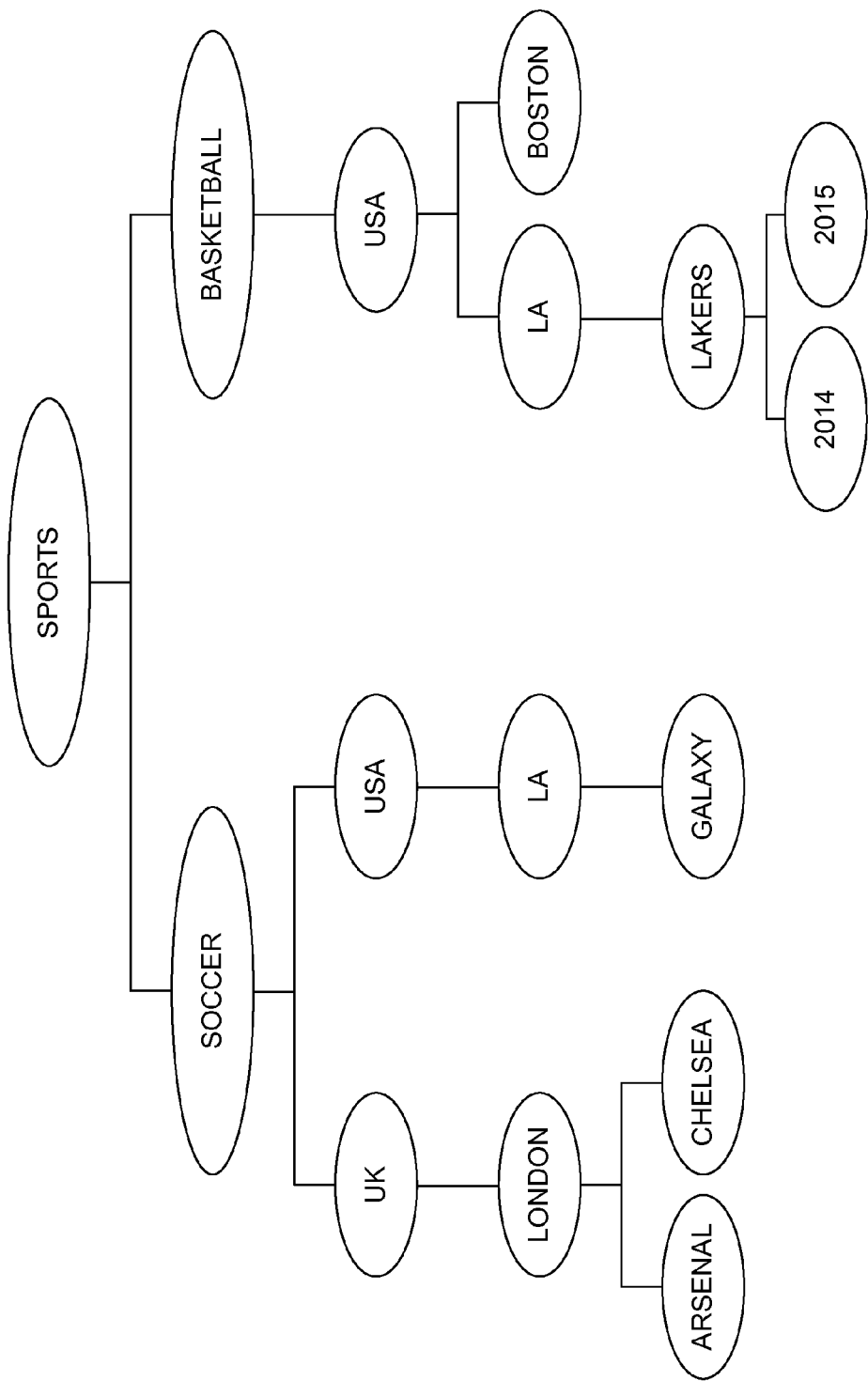
FIG. 4 is an example topic tree, in accordance with an embodiment of the invention.

Referring to step S220, message delivery program 112 determines if a topic path exists for the content received in step S210. A topic path is a chain of metadata descriptors, based on the order of classification in a topic tree. A topic tree may be a visual representation of a taxonomical classification for the hierarchy of the metadata descriptors, where metadata descriptors higher on the topic tree encompass the metadata descriptors beneath them. For example, FIG. 4 is an example embodiment of a topic tree. In the example topic tree, a metadata descriptor (or a class), such as sports, may contain subclasses of descriptors, such as soccer and basketball. Each subclass may contain further subject specific subclasses, referring to geography (country, city), team, player, date, where each specific level of a subclass is a narrower subclass from the previous subclass. Further, classes and subclasses may be appended following the subject specific classes with information such as, for example, author of the content, publisher of the content, type of content, etc. In the example, a topic path may include a chain of metadata descriptors such as sports/basketball or sports/soccer/UK/London. If a topic path exists based on the existing topic tree, message delivery program 112 proceeds to step S230. If a topic path does not exist, message delivery program 112 proceeds to step S225.

Referring to step S225, message delivery program 112 generates a topic path for the content, and creates a new branch of the topic tree. The new branch of the topic tree may be created when the content received in step S210 contains a new species in a subclass. This may be determined from metadata tags on the content that already exist in the topic tree, and adding a branch underneath the last existing metadata tag of the content for the new species. For example, in FIG. 4, if a piece of content is received with metadata tags for "sports," "basketball," "USA" and "Miami" a new branch may be created underneath the USA subclass to contain information related to a new city, Miami. Further, the topic path for said content would be sports/basketball/USA/Miami.

Referring to step S230, message delivery program 112 checks if the topic path of the content matches a preferred topic path. Message delivery program 112 identifies the preferred topic paths by referencing subscriber preferences 114, and if the topic path of the content matches a preferred topic path, message delivery program 112 proceeds to step S232. If the topic path of the content does not match a preferred topic path, message delivery program 112 proceeds to step S236.

Referring to step S232, message delivery program 112 determines if the unique ID associated with the topic path of the content exists in the subscriber queue. The unique IDs are user specific IDs that are associated with the user preferred topic paths from user preferences 114. In one embodiment, the unique IDs are the topic tree path such as, for example, sports/soccer/UK/London/Chelsea. In another embodiment, the unique ID may be a shortened string, such as the hash value of the topic tree path. In yet another embodiment, the unique ID may be a randomly created string of characters assigned to the topic tree path, and stored in the user preferences 114. If the unique ID exists, message delivery program proceeds to step S236. If the unique ID does not exist, message delivery program 112 proceeds to step S234.

Referring to step S234, message delivery program 112 creates a unique ID in the subscription queue for the topic tree path for the piece of content. In one embodiment, the unique ID may be created from the topic tree path. In another embodiment, the unique ID may be created using a hash value algorithm on the topic tree path to create a truncated character string associated with the topic tree path. In yet another embodiment, the unique ID may be a randomly assigned set of characters, that is then stored in the user preferences so that it may be recalled in the future.

Referring to step S236, message delivery program 112 places the received content in the subscription queue. During step S230, message delivery program 112 determines whether the topic path of the content matches a preferred topic path. If the topic paths match, then message delivery program 112 associates the content, or alternatively a link to the content, to the unique ID and places the content in the subscriber subscription queue. If the topic paths do not match then the path of the content, or alternatively a link to the content, is stored in the subscriber subscription queue as content not associated with any unique ID.

Referring to step S240, message delivery program 112 receives a call from subscriber device 130 for new content, and obtains the preferences for that specific subscriber. The call from the subscriber device 130 may contain identifying information. The message delivery program 112 cross-references the identifying information with subscriber preferences 114 in order to determine what preferences to use for the subscriber, and also obtain the associated preferences for that subscriber from subscriber preferences 114. Further, the call from the subscriber device 130 may additionally contain information about the number, and types, of content that are currently on the subscriber device 130.

Referring to step S250, message delivery program 112 determines the topic path, for the most preferred available topic from the subscriber preferences 114. In one embodiment, subscriber preferences 114 may be ordered such that there is a most preferred subclass. For example, a user may choose a preference for sports related to LA (i.e. sports/*/LA, wherein * represents any subclass). In such an example, message delivery program 112 would determine that the preferred topic paths would be sports/soccer/USA/LA and sports/basketball/USA/LA. In another embodiment, user preferences 114 may contain rules to weight the different branches of the topic tree. In said embodiment, message delivery program 112 may determine the preferred topic using a formula, where each specific subclass is assigned a value, and the message delivery program 112 adds each value to find a preferred topic path. For example, a user may assign a +1 rating to LA, and a +1 rating to soccer. In such an example, the most preferred topic path associated with a unique ID would be sports/soccer/USA/LA, with a total rating of +2, while the second most preferred topic path associated with a unique ID would be sports/soccer and sports/basketball/USA/LA. In another example, a user may assign a +1 rating to soccer/UK, and a −2 rating to Arsenal. In such an example, the most preferred topic path associated with a unique ID would be sports/soccer/UK/*/~Arsenal (where ~represents not), while the least preferred topic path associated with a unique ID would be sports/soccer/UK/London/Arsenal.

Referring to step S255, message delivery program 112 determines if the topic count is exceeded. Message delivery program 112 determines if the topic count is exceeded by comparing the number of pieces of content on subscriber device 130, and comparing that with the maximum number of pieces of content from subscriber preferences 114 to determine if the maximum number would be exceeded by delivering the most preferred piece of content. For example, if the unique ID for the most preferred topic is sports/soccer/UK/London/Chelsea, and subscriber preferences 114 contains a maximum of 9 pieces of content under the subclass sports/soccer/* and there are currently 9 pieces of content related to the soccer subclass, then the number of pieces of content for the most preferred topic is exceeded. If the topic count is exceeded, the message delivery program returns to step S250 to determine the next most preferred topic. If the topic count is not exceeded, the message delivery program proceeds to step S260.

Referring to step S260, message delivery program 112 finds the content chain associated with the most preferred unique ID. The unique ID may be linked to multiple pieces of content that may be categorized by the same topic tree path as the unique ID.

Referring to step S265, message delivery program 112 determines if there is available content in the unique ID that has not previously been sent to the subscriber device 130. Message delivery program does this by determining if there are any links in the unique ID message chain from step S260 that have not been previously sent to the subscriber device 130. If there is no content available, message delivery program 112 returns to step S250 to obtain the next preferred topic. If there is content available, message delivery program 112 proceeds to step S270.

Referring to step S270, message delivery program 112 delivers the next piece of content to the subscriber device 130. The next message is the first message received by the message delivery program under the unique ID. Either message delivery program 112, message receiving program 132, or both log what content has been received, and the metadata characteristics of the content that is currently on the subscriber device 130, so that message delivery program 112 may align with subscriber preferences 114.

Referring to step S275, message delivery program 112 determines if more content is requested by the subscriber device 130. The subscriber device 130 may not request more content if the total amount of content exceeds a value contained in subscriber preferences 114. In one example, the total amount of content may be measured by number of pieces of content. In another example, the total amount of content may be measured by the size of the content (e.g. 1 GB of data). If more content is requested, message delivery program 112 returns to step S250. If more content is not requested, then message delivery program 112 waits for a subsequent subscriber call in step S240.

Figure 3:
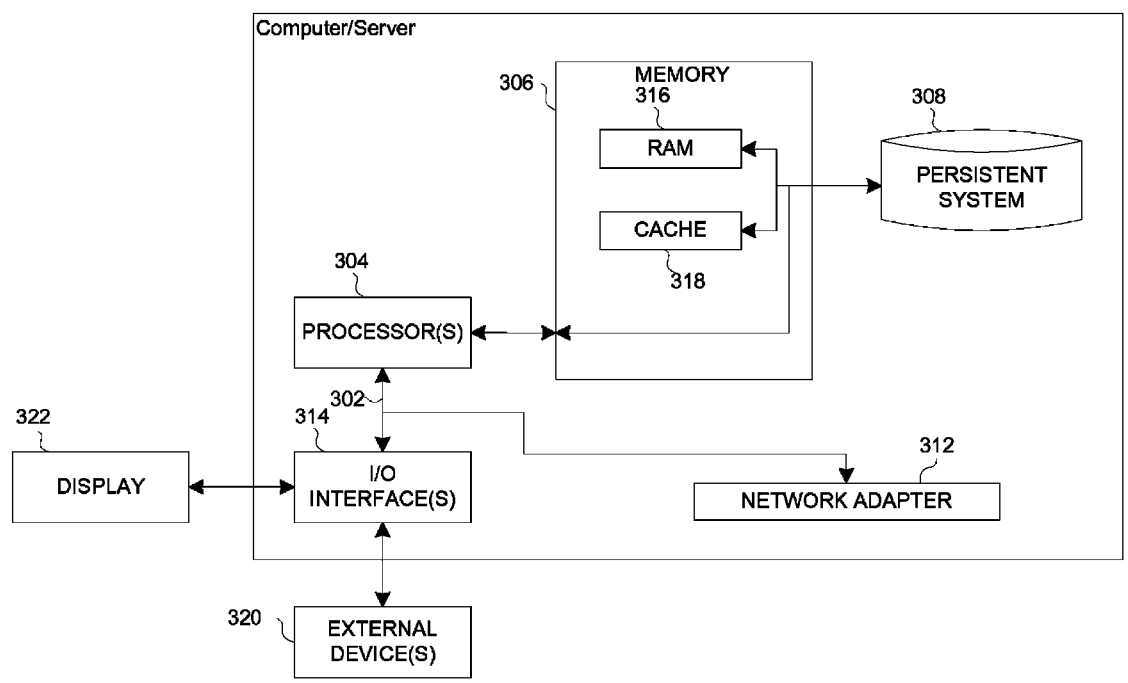
FIG. 3 is a block diagram depicting the hardware components of the message delivery system of FIG. 1, in accordance with an embodiment of the invention.

FIG. 3 depicts a block diagram of components of message delivery device 110, publisher device 120, and subscriber device 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Message delivery device 110, publisher device 120, and subscriber device 130 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs message delivery program 112 and subscriber preferences 114 in message delivery device 110; message creation program 122 in publisher device 120; and message receiving program 132 in subscriber device 130 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs message delivery program 112 and subscriber preferences 114 in message delivery device 110; message creation program 122 in publisher device 120; and message receiving program 132 in subscriber device 130 may be downloaded to persistent storage 308 through communications unit 312.

I/O interface(s) 314 allows for input and output of data with other devices that may be connected to message delivery device 110, publisher device 120, and subscriber device 130. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the programs message delivery program 112 and subscriber preferences 114 in message delivery device 110; message creation program 122 in publisher device 120; and message receiving program 132 in subscriber device 130, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for disseminating messages to a user, the method comprising:
   receiving, from a publisher device, a plurality of messages;
   classifying, by a message delivery device, each of the plurality of messages based on metadata associated with each message, wherein the metadata includes one or more topics, wherein classifying the plurality of messages comprises determining where in a topic tree each message in the plurality of messages belongs, wherein the topic tree comprises one or more branches, and wherein each of the one or more branches has an associated subtopic that corresponds to a topic;
   associating each message with a uniqueID, wherein the uniqueID is a hash value of the location of the topic in the topic tree;
   placing the uniqueID in a queue associated with an individual user device, wherein placing the uniqueID into a location of the queue is based on an association between a topic of the uniqueID and a topic from a preferred topic list for the individual user device;
   receiving, from the user device, a request for a message, wherein the request for the message is based on determining an amount of content on the user device is below a threshold capacity;
   determining a first preferred topic of the first preferred topic list associated with the user device, wherein determining the first preferred topic further comprises:
   associating a weight with branches of the topic tree; and
   determining a cumulative weight for each topic of the topic tree, wherein the cumulative weight is a summation of all of the preceding branches of the topic tree; and
   selecting the subtopic to be the first preferred topic of the first preferred topic list associated with having the highest cumulative weight;
   based on receiving a request for a message, determining a message associated with the uniqueID in the individual queue that corresponds to the first preferred topic; and
   sending, to the user device, the message corresponding to the first preferred topic.

2. The method of claim 1, wherein determining the first preferred topic comprises selecting a highest ranked topic from a preferred topic list, and wherein the preferred topic list comprises a ranking associated with the user of one or more topics.

3. The method of claim 1, further comprising determining the user has received a maximum amount of messages for the first preferred topic, and sending the user a message associated with a second preferred topic, wherein the first preferred topic has a greater value than the second preferred topic, and wherein the greater value comprises one or more of a higher weight and a higher rank.

4. The method of claim 1, wherein the one or more topics corresponding to the metadata comprise topics located in a topic tree, wherein the topic tree comprises one or more branches, and wherein the each branch represents a relationship between a topic and a subtopic.

5. The method of claim 1, further comprising:
   determining that the topic of the message does not correspond to the branch of the topic tree;
   based on determining that the topic does not correspond, creating a new branch of the topic tree; and
   classifying the topic of the message as belonging to the new branch of the topic tree.

6. The method of claim 1, wherein determining the message associated with the uniqueID in the individual queue that corresponds to the first preferred topic further comprises determining the message was not previously sent to the user device.

7. The method of claim 1, wherein the request for the message comprises a notification from a device that the device is capable of receiving the message.

8. A computer program product for disseminating messages, the computer program product comprising:
   one or more computer-readable storage devices and program instructions stored on at least one of the one or more tangible storage devices, the program instructions comprising:
   program instructions to receive a plurality of messages;
   program instructions to classify each of the plurality of messages based on metadata associated with each message, wherein the metadata includes one or more topics, wherein program instructions to classify each of the plurality of messages comprises program instructions to determine where in a topic tree each message in the plurality of messages belongs, wherein the topic tree comprises one or more branches, and wherein each of the one or more branches has an associated subtopic that corresponds to a topic;

program instructions to associate each message with a uniqueID, wherein the uniqueID is a hash value of the location of the topic in the topic tree;

program instructions to place the uniqueID in a queue associated with an individual user, wherein placing the uniqueID into a location of the queue is based on an association between a topic of the uniqueID and a topic from a preferred topic list for the individual user;

program instructions to receive a request for a message from the user, wherein the request for the message is based on determining an amount of content on the user device is below a threshold capacity;

program instructions to determine a first preferred topic of the first preferred topic list associated with the user, wherein the first preferred topic is determined by:

associating a weight with branches of the topic tree; and determining a cumulative weight for each topic of the topic tree, wherein the cumulative weight is a summation of all of the preceding branches of the topic tree; and selecting the subtopic to be the first preferred topic of the first preferred topic list associated with having the highest cumulative weight;

based on receiving a request for a message, program instructions to determine a message associated with the uniqueID in the individual queue that corresponds to the first preferred topic; and program instructions to send the message corresponding to the first preferred topic to the user.

9. The computer program product of claim 8, wherein the program instructions to determine the first preferred topic comprises program instructions to select a highest ranked topic from a preferred topic list, and wherein the preferred topic list comprises a ranking associated with the user of one or more topics.

10. The computer program product of claim 8, further comprising the program instructions to determine the user has received a maximum amount of messages for the first preferred topic, and program instructions to send the user a message associated with a second preferred topic, wherein the first preferred topic has a greater value than the second preferred topic, and wherein the greater value comprises one or more of a higher weight and a higher rank.

11. The computer program product of claim 8, wherein the one or more topics corresponding to the metadata comprise topics located in a topic tree, wherein the topic tree comprises one or more branches, and wherein the each branch represents a relationship between a topic and a subtopic.

12. A computer system for disseminating messages, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive a plurality of messages;

program instructions to classify each of the plurality of messages based on metadata associated with each message, wherein the metadata includes one or more topics, wherein program instructions to classify each of the plurality of messages comprises program instructions to determine where in a topic tree each message in the plurality of messages belongs, wherein the topic tree comprises one or more branches, and wherein each of the one or more branches has an associated subtopic that corresponds to a topic;

program instructions to associate each message with a uniqueID, wherein the uniqueID is a hash value of the location of the topic in the topic tree;

program instructions to place the uniqueID in a queue associated with an individual user, wherein placing the uniqueID into a location of the queue is based on an association between a topic of the uniqueID and a topic from a preferred topic list for the individual user;

program instructions to receive a request for a message from the user, wherein the request for the message is based on determining an amount of content on the user device is below a threshold capacity;

program instructions to determine a first preferred topic of the first preferred topic list associated with the user, wherein the first preferred topic is determined by:

associating a weight with branches of the topic tree; and determining a cumulative weight for each topic of the topic tree, wherein the cumulative weight is a summation of all of the preceding branches of the topic tree; and selecting the subtopic to be the first preferred topic of the first preferred topic list associated with having the highest cumulative weight;

based on receiving a request for a message, program instructions to determine a message associated with the uniqueID in the individual queue that corresponds to the first preferred topic; and program instructions to send the message corresponding to the first preferred topic to the user.

13. The computer system of claim 12, wherein the program instructions to determine the first preferred topic comprises program instructions to select a highest ranked topic from a preferred topic list, and wherein the preferred topic list comprises a ranking associated with the user of one or more topics.

14. The computer system of claim 12, further comprising the program instructions to determine the user has received a maximum amount of messages for the first preferred topic, and program instructions to send the user a message associated with a second preferred topic, wherein the first preferred topic has a greater value than the second preferred topic, and wherein the greater value comprises one or more of a higher weight and a higher rank.

* * * * *